UNITED STATES PATENT OFFICE.

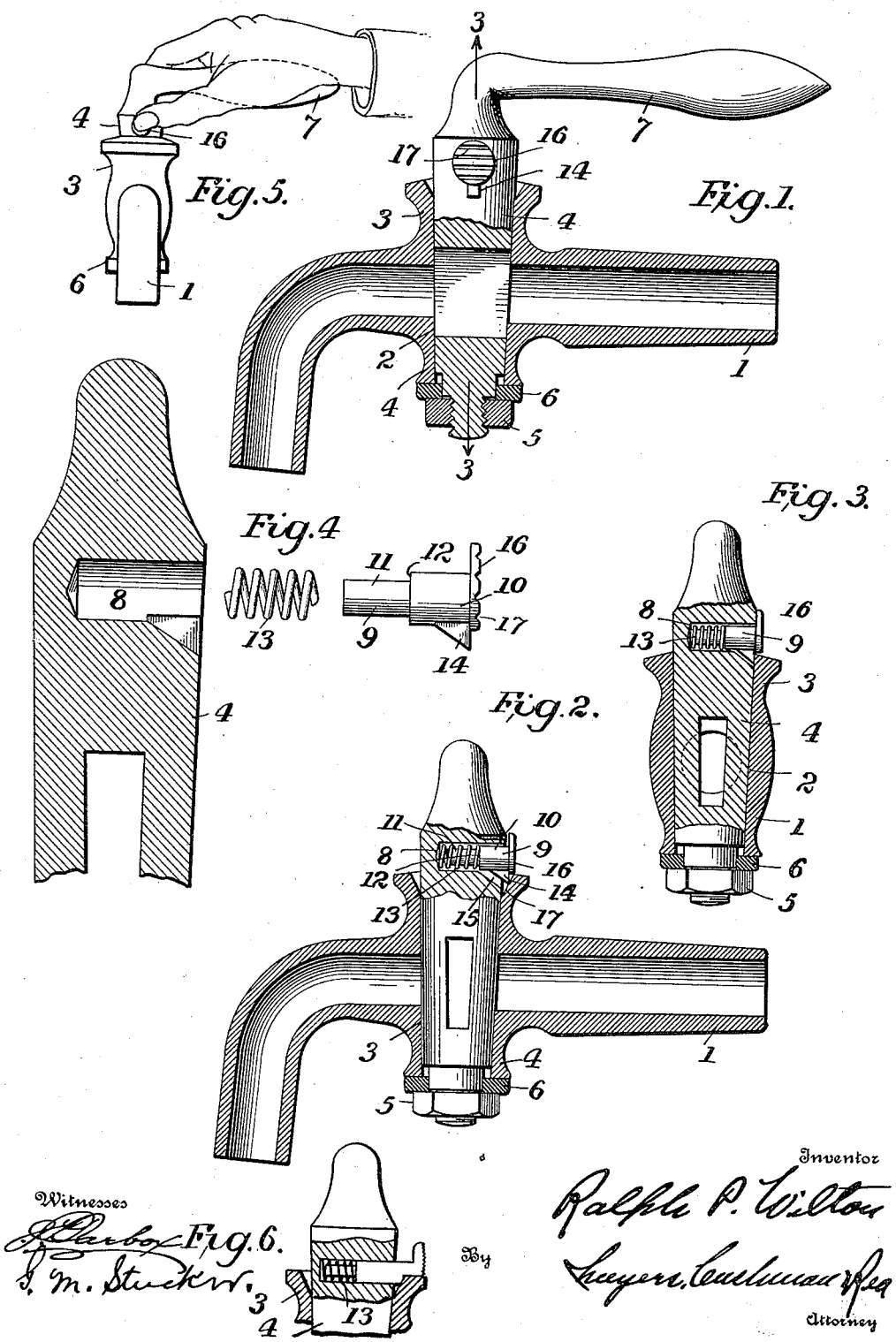

RALPH P. WILTON, OF WRIGHTSVILLE, PENNSYLVANIA.

LOCKING MEANS FOR VALVES.

1,043,281. Specification of Letters Patent. Patented Nov. 5, 1912.

Application filed August 12, 1909. Serial No. 512,500.

*To all whom it may concern:*

Be it known that I, RALPH P. WILTON, a citizen of the United States, residing at Wrightsville, in the county of York and State of Pennsylvania, have invented new and useful Improvements in Locking Means for Valves, of which the following is a specification.

My invention relates to a locking means especially adapted for use in connection with valves in which the seat and the valve disk or plug have a movement with respect to each other. This movement is in some cases angular, and in other cases rectilinear. In cases in which the movement between the valve seat and disk or plug is rectilinear it often happens that the member carrying the valve disk or plug has an angular movement with respect to the member carrying the seat of the valve, and in such cases my locking means can be used without modification. In cases where there is no angular movement between the parts, my device may be used at times without modification, and at certain other times certain slight modifications may be found necessary.

The object of the invention is to produce a simple and easily applied device which may be applied with ease to valves of the type mentioned during their course of construction and may also be easily applied to valves already constructed without changing their structure or defacing them in any manner.

My invention also has for its object to produce a device having the characteristics named, and, which at the same time, will be efficient in operation and cheap to manufacture and apply.

That I have attained all the objects of my invention will be apparent from the following specification, taken in connection with the accompanying drawings, in which—

Figure 1 is a longitudinal sectional elevation of a valve with my improved locking means applied thereto. Fig. 2 is a similar view of the same, showing the valve closed. Fig. 3 is a section taken along line 3—3 of Fig. 1. Fig. 4 is an assembly view showing parts of my improved device in their order of assembly. Fig. 5 is a small perspective view showing the proper use of my device, and Fig. 6 is a view showing a modification of the same.

Referring to the drawings 1 is the main casting or the casing of the valve which carries within it a valve seat 2, in this case shown at right angles to the direction of flow through the valve. Collars 3 and 4 projecting from opposite sides of the main casing provide an extended bearing for the movable member or plug 4. The member 4 is ground with the valve seat 2 until a good fit is made as is common in valve construction. A nut 5 screw threaded on its lower end bears upon a washer 6 resting on the lower collar 4, and holds the member 4 in position. At its opposite or upper end the member 4 is provided with a handle 7 wherewith it may be turned in order to open and close the valve.

Transversely of the member 4 and just at the top of the collar 3, I make a cavity 8 by casting or drilling or any other way which I may find most convenient. I prefer to drill this cavity, as it is easily and cheaply done. Within this cavity I locate a locking bolt 9. This bolt 9 is formed with a main portion 10 of a certain diameter and a second portion 11 concentric with the first, but of smaller diameter, there being a shoulder 12 at the juncture of the two portions of the bolt. The smaller portion I insert foremost in the cavity, placing a spring 13 thereon which bears against the shoulder 12 and against the bottom of the cavity, and tends to thrust the bolt from the cavity. The outer end of the bolt 9 is provided with a depending portion, lug, or projection 14 which is accommodated in a cut away portion 15 at the outer end of the cavity. On the same end the bolt is provided with a thumb piece 16 by which it may be pressed into a cavity against the pressure of spring 13. In the collar 3 I cut a series of notches 17 to coöperate with the part 14 of the bolt.

The operation of my locking means is readily apparent.

The part 14 of the bolt engages the notches 17, being held therein by the outward pressure of spring 11. This prevents member 4 from being moved to open or close the valve as the case may be until the bolt is pressed inward and the part 14 on its end moved out of the notch in which it rests.

I am aware that it is not new to provide a lock of this general nature for use with a valve, particularly with faucets and bibs and gas cocks similar in construction to the valve in connection with which I have illustrated my invention. I, therefore, do not claim the invention of the broad idea, but my device is possessed of a number of novel features and distinct advantages which make it a valuable product.

In the first place my locking means is extremely simple and most easily applied, both to valves in the course of construction and those already constructed or in use. All that is necessary to be done in order to apply it is to make a transverse cavity 8 in the member 4 at the proper point, which as has been said should be adjacent the top or rim of the collar 3 or adjacent the point where the member 4 enters the casing 1, then assemble the bolt and its spring in the manner shown in Fig. 5, and insert the member 4 in its proper place, the bolt being then held in position by the engagement of the end 14 of the bolt with the inner portion of the collar or other part of the casing 1. The notches 17 and the recesses 15 it will be noted are cut on a bias, or are cut angling in such a manner that they may be easily and quickly cut by a suitable chisel or other tool. The device may thus be most easily applied to any valve, and without defacing the same, the notches 17 being formed on the inside of the collar 3 and the thumb piece 16 closing the mouth of the cavity 8.

In the second place my device is simple and efficient in operation. Preferably I provide two cavities 17, one at each end of a diameter and so placed with respect to the locking bolt and the casing that when the end of the bolt engages the notches the valve will be held closed, movement between the fixed and movable members of the valve being prevented. Preferably also I locate the bolt 9 as shown at right angles to the handle portion 7, which extends from the top or stem of the member 4, this location of the locking bolt being most convenient for its operation by the thumb of the hand which grasps the handle. This is clearly shown in Fig. 5. The end of the bolt engages a notch immediately adjacent its bearing the cavity 8, and, therefore, insures a good firm locking action. The thumb piece 9 being on the same end as that which engages the notches in the casing 1, the pressure necessary to release the lock is small inasmuch as it is directly applied to the point where needed. Normally the valve is closed and the parts occupy the position shown in Fig. 2. In order to open the valve the handle is grasped as shown in Fig. 5, and the bolt pressed inward to unlock the valve by applying the end of the thumb to the thumb piece 9. The valve may be opened to any desired degree, and when it is again shut the lock acts automatically to prevent the valve being accidentally moved too far, thus again opening the same, and, of course, holds the same in closed position. I find that my lock acts so quickly that when the valve is closed by the most rapid movement it promptly locks the same in closed position and effectually prevents its movement past that position.

In the third place my device is simple and very cheap to manufacture and apply. There are but two parts to my device in addition to the valve structure proper. These parts are, the locking bolt 9, which is preferably made straight as shown and in one piece, and the spring 13. By terminating the transverse cavity short of the side of the member opposite that which it enters I provide an end seat for the spring 13. By locating the cavity on the member 4 so that when the member 4 is in position the end of the cavity will be adjacent the rim of the collar 3, I make it possible to imprison the locking bolt 9 and its actuating spring 13 in position within the member 4. Thus no screws or other attaching and confining means are necessary. At the same time the end of the bolt is in such a position and is so formed that it serves both to engage the notches and accomplish the locking, and to carry a thumb piece wherewith the bolt may be operated. The cavity 8 may be drilled and its offset 15 and the notches 17 which are biased may be milled, chiseled, or otherwise formed with ease.

In Fig. 6 I depict a modification of my invention in which the end of the locking bolt is formed without the projecting part 14, the bolt being located a trifle lower so that the axis of the bolt lies approximately in the plane in which lies the collar 3. The embodiment of the end of the bolt in this manner may cheapen the construction of the bolt 9 in some instances. This bolt may be readily formed in many ways apparent to a skilled mechanic.

While I have described the best form of my invention now known to me, it is, of course, understood that many changes may be made in its mechanical embodiment without departing from its generic spirit. For instance, it may be applied to a form of valve other than that shown in the drawings, and in such application slight modifications may be made without departing from the generic spirit of my invention. Again, it is evident that the part of the valve in which the notches are located may be a part other than the collar 3 of the casing 1, and may be any fixed part of or attached to the casing. I wish to have it understood that I desire to cover all such modifications in the annexed claims.

What I claim is:

1. A locking device for valves and the like comprisig a tubular casing, a valve plug in said casing protruding beyond one end of the same, having in its protruding portion a transverse bore, and a recess in the plug extending downwardly from said bore at its outer end below the top of the casing, a locking bolt slidably fitted within said bore having an inner portion of reduced diameter forming a shoulder on the bolt, and a lug on said bolt movable in said recess, a spring surrounding said reduced portion and bearing at its ends against said shoulder and the bottom of the bore to press said bolt outwardly, said casing having interiorly formed diametrically opposite notches each of which is adapted to receive said lug when brought in line therewith to lock said valve plug, a handle for turning said plug, and a surface on the outer end of said bolt for a finger which when pressed releases said lug from an engaged notch in the tubular casing.

2. A locking device for valves and the like comprising in combination, a tubular casing, a valve plug rotatable in said casing protruding beyond one end of the same and having within its protruding portion a transverse bore extending partly through the plug, and a recess in the plug extending downwardly from said bore at its outer end below the top of the casing, a locking bolt slidable longitudinally within said bore provided with a lug on its under side movable in said recess, and with a reduced inner end, a spring surrounding said reduced end and bearing against a shoulder on the bolt and the bottom of the bore, the upper end of said tubular casing being in line with the lower wall of the bore in the plug and having interior diametrically disposed notches in said upper end to receive the lug on said bolt when the lug is brought in line therewith to lock the valve plug, a handle to turn said plug, and a finger plate on the locking bolt in position to be easily reached by the thumb when the hand grasps the handle.

3. A latch for a valve comprising in combination, a tubular casing, a valve plug mounted to turn therein, said plug protruding above the casing and having an upper laterally extending handle, said plug having within its protruding portion a transverse bore extending partly through the plug at right angles to said handle, a locking bolt slidably seated within said bore, a reduced portion shouldered from the body of the bolt spaced from the wall of the bore, and a lug on the underside of said bolt, a spring surrounding said reduced portion and bearing at its ends against the shoulder of the bolt and the bottom of the bore, said casing having oppositely disposed interior notches at its upper end adapted to aline with a recess in said plug as the latter is turned, the lug on said bolt normally lying in the recess in the plug and being forced outwardly under tension of the spring when said recess and a notch are alined, and a finger plate on the outer end of said bolt by means of which the bolt is forced inwardly and the lug disengaged from the notch to unlock the valve plug.

In testimony whereof I have hereunto set my hand in presence of two subscribing witnesses.

RALPH P. WILTON.

Witnesses:
WALTER B. CRUMBLING,
E. M. COLFORD.